(12) United States Patent
Morrison (10) Patent No.: US 8,453,691 B1
(45) Date of Patent: Jun. 4, 2013

(54) HIGH EFFICIENCY HEAVY DUTY AUTOMOTIVE WHEEL

(76) Inventor: Glenn Arthur Morrison, Momence, IL (US)

(*) Notice: Subject to any disclaimer, the term of this patent is extended or adjusted under 35 U.S.C. 154(b) by 707 days.

(21) Appl. No.: 12/661,139

(22) Filed: Mar. 11, 2010

(51) Int. Cl.
  *B60C 5/00* (2006.01)
  *B60C 5/20* (2006.01)
  *B60C 17/00* (2006.01)

(52) U.S. Cl.
  USPC .............. 152/331.1; 152/339.1; 152/516

(58) Field of Classification Search
  USPC .......................... 152/331.1–501
  See application file for complete search history.

(56) References Cited

U.S. PATENT DOCUMENTS

| | | | | |
|---|---|---|---|---|
| 516,313 A | * | 3/1894 | Lindner et al. | 152/315 |
| 580,884 A | | 4/1897 | Murphy | |
| 804,369 A | * | 11/1905 | Beasley | 152/320 |
| 1,343,685 A | * | 6/1920 | Runyan | 152/315 |
| 1,471,949 A | * | 10/1923 | Doranski | 152/9 |
| 2,293,907 A | | 8/1942 | LeBus | |
| 2,572,594 A | | 10/1951 | Bushemi | |
| 4,280,546 A | | 7/1981 | Mistretta | |
| 4,293,017 A | | 10/1981 | Lambe | |
| 4,371,023 A | | 2/1983 | Campagna | |
| 4,922,981 A | | 5/1990 | Pompier | |
| 5,067,932 A | | 11/1991 | Edwards | |
| 5,109,905 A | | 5/1992 | Lambe | |
| 5,236,055 A | | 8/1993 | Legal | |
| 5,885,383 A | | 3/1999 | French | |
| 6,470,935 B1 | | 10/2002 | Fulsang | |
| 6,701,985 B2 | | 3/2004 | Russell | |
| 7,100,654 B2 | | 9/2006 | Boiocchi et al. | |
| 7,104,297 B2 | | 9/2006 | Russell | |
| 2006/0060279 A1 | * | 3/2006 | Jansson et al. | 152/331.1 |

* cited by examiner

*Primary Examiner* — Richard Crispino
*Assistant Examiner* — Kendra Shin (57) ABSTRACT

An automotive wheel used to substantially reduce energy loss due to tire flex and energy loss from a conventional drive train. The wheel includes a wheel hub, two sidewalls, an inner low pressure pneumatic chamber with hub protector, and an outer tread ring with inner tread wall and semi-rigid outer tread, containing an elastic band. The hub can contain an electric hub motor. The pneumatic chamber and a porous restraint band position the outer tread ring and enable the wheel to simulate an energy efficient high pressure pneumatic when, experiencing little deformation when under smooth road conditions. When road conditions are rough, the sidewalls and the outer tread ring temporarily flex in response to the increased road forces, simulating a low pressure conventional tire having ample space for deformation.

16 Claims, 6 Drawing Sheets

HIGH EFFICIENCY HEAVY DUTY AUTOMOTIVE WHEEL

CROSS-REFERENCE TO RELATED APPLICATIONS

The porous ring restraint band and hub protector are also found in the previous application of Ser. No. 11/769,566, filed 2007 Jun. 27, prepared by David J. Bremer, Reg. #51497, for the present inventor.

FEDERALLY SPONSORED RESEARCH

Not Applicable

SEQUENCE LISTING OR PROGRAM

Not Applicable

FIELD OF INVENTION

The present invention relates to automotive wheels and, more particularly, to energy-efficient automotive wheels.

BACKGROUND

In the late 19th and early 20th centuries, the design of automotive wheels was based on that of bicycle tires, having thin walls with high pressure and narrow profiles. The advantages were high energy efficiency with low energy loss due to tire flex. Disadvantages were a hard ride and frequent punctures. As time went on, engines became more powerful and fuel became less expensive. Freedom from flats and ride comfort took top priority, leading to wider, lower pressure, thicker tires. These tires involved greater energy loss mainly due to tire flex at and near the area of contact with the road. Recently however, energy conservation has once again become of prime importance. The need for higher energy efficiency in the wheel, among other automotive subsystems, is paramount.

Numerous approaches to increasing the effectiveness of electric and hybrid vehicles have been implemented: shaping the vehicle to reduce aerodynamic drag, larger battery capacity, and regenerative braking are among them. These approaches are effective as far as they go. However, little has been done to remedy a serious source of wasted energy in vehicles: the process of vehicle kinetic energy being converted to heat due to tire flex.

Under smooth road conditions, the ideal energy conserving tire has thin walls and is inflated to high pressure. The tire is supported by the rim which functions as a rigid support. A narrow high pressure bicycle tire is an example. A small amount of tire flex occurs at or near the road contact, leading to reduced energy loss.

Under rough road conditions with large obstructions, shock absorption and cushioning are the major requirements, that only a low pressure, large chambered tire can satisfy. Conventional automotive tires meet these requirements well. These tires rely on one inflated low pressure thick-walled air chamber for operation on both smooth and rough roads. Thus a conventional tire is largely biased towards cushioning on rough roads, while sacrificing the energy saving characteristics of narrow high pressure tires.

Past attempts have been made to design multichambered pneumatic tires with energy-conserving features. Lambe (U.S. Pat. No. 5,109,905) discloses a two-chambered pneumatic tire, with the goal of reducing tire flex and conserving energy. An outer high pressure chamber is intended to simulate a high pressure pneumatic tire. An inner low pressure pneumatic chamber is intended to simulate a conventional low pressure tire with cushioning effect.

However, Lambe's tire would result in at most a small improvement in efficiency over a conventional tire, for two reasons. Without internal restraints in the low pressure chamber to position the outer chamber relative to the hub, a very high outer chamber pressure would be required to stiffen the tread sufficiently to adequately reduce tire flex at and near the road contact. There is nothing present that enables simulation of the rigid support provided to a narrow high pressure tire by its rim. Also, even if the outer chamber were stiffened substantially, without internal restraints in the low pressure chamber the outer chamber would not remain centered on the rotational axis. Thus the sidewalls would flex to about the same extent as with a conventional tire. Much of the outer chamber would move vertically in response to a road obstruction, possibly leading to an actual reduction in efficiency. The outer chamber may have increased stiffness because of the high pressure, but the restoring force profile (i.e. the restoring force as a function of tire deformation) is similar to that of a conventional automotive tire. As a result the Lambe tire cannot simulate a high pressure pneumatic tire on a smooth road as effectively as the present device.

An energy conserving wheel featuring a rigid outer tread suspended over a rim by an elastic band is disclosed by Russell (U.S. Pat. Nos. 6,701,985 and 7,104,297). While this wheel is intended for heavy duty applications, it has three basic problems. The distance from tread to rim is shallow, leading to possible rim damage from road impacts. Second, only a small portion of the elastic band actually stretches to play a direct part in supporting the tread, leading to an inefficient use of material. Third, the elastic band is intended to slide against the perforations of the tread actuator, this occurring constantly on each rotation of the wheel. This may cause wear and failure of the elastic band.

References to multi-chambered tires for the purpose of reducing the effects of punctures occur, for example in Fulsang (U.S. Pat. No. 6,470,935), Bushemi (U.S. Pat. No. 2,572,594), and Murphy (U.S. Pat. No. 580,884). These examples make no reference to energy saving features.

References to hub protectors exist, for example Boiocchi et al (U.S. Pat. No. 7,100,654), French (U.S. Pat. No. 5,885,383), and Pompier (U.S. Pat. No. 4,922,981). These devices serve to reduce damage to the hub and rim after a puncture, but are not designed to function as shock absorbers or suspensions.

The present device features a tire which meets the requirements for rough and smooth roads in such a manner that each of the two requirements comes into play only when required by the specific road condition. Thus each of the two requirements can be met separately and optimally. On a smooth road, internal restraint bands hold the outer tread ring in a position concentric with the hub and axle. On a rough road, that part of the outer ring near the road contact flexes inward toward the hub, bringing the cushioning effect of the low pressure chamber into play. Additional reductions in energy consumption can be gained by incorporating an electric hub motor, which reduces or eliminates the need for the typical drive train implemented between the engine and the conventional wheel.

The previous attempts at producing a heavy duty tire design combining the advantages of energy conservation on smooth roads and cushioning on rough roads have proven inadequate. The present device however, meets these requirements: (1) simulation of a high pressure pneumatic tire on smooth roads, (2) simulation of a cushioning effect of a conventional low pressure tire on rough roads, (3) functioning as a shock absorber and suspension on rough roads, and (4) a non-pneumatic outer tread ring, to prevent punctures.

OBJECTS OF THE INVENTION

It is therefore an object of the invention to reduce energy loss in automotive wheels due to tire flex.

It is another object of the invention to simulate an energy-efficient high pressure pneumatic tire on smooth roads.

It is another object of the invention to simulate a low pressure cushioning tire on rough roads, providing an internal suspension and shock absorber for ride comfort and to protect the hub.

It is another object of the invention to provide an internal suspension and shock absorber to reduce energy loss due to road-induced vertical motion of the wheel, to reduce need for external suspension.

It is another object of the invention to reduce energy loss due to a complex drive train by utilizing an electric hub motor.

It is another object of the invention to provide a flat-resistant tire.

SUMMARY

The present device is a heavy duty energy saving automotive wheel which substantially reduces energy loss due to tire flex and energy loss from a conventional drive train. An embodiment of the device includes a wheel hub, two sidewalls, an inner low pressure pneumatic chamber, a flexible inner tread wall and a semi-rigid outer tread suspended on an elastic band. An embodiment may include an electric hub motor which rotates the hub and tire, propelling the vehicle. The hub, sidewalls and inner tread wall contain a low pressure pneumatic chamber which positions the semi-rigid outer tread and enables the wheel to simulate an energy efficient high pressure pneumatic wheel, experiencing little deformation when under smooth road conditions. When road conditions are rough, the sidewalls can temporarily buckle in response to the increased road forces, simulating a conventional tire having ample space for deformation. An embodiment may include one or more ring restraint bands in the low pressure chamber for better control of the restoring force on the semi-rigid tread ring when the ring is deformed. An embodiment may include a shock absorbing hub protector located in the low pressure pneumatic chamber. An embodiment may include an automatic device for maintaining the correct gas pressure in the pneumatic chamber. An embodiment may include disk brakes. An embodiment may include a replaceable tread to be installed over the outer tread ring.

DETAILED DESCRIPTION OF THE PRESENT DEVICE

The present device is an energy-efficient automotive wheel 10 for light, medium and heavy duty use. The main purpose of the wheel is to aid in overcoming the lack of energy efficiency of modern automotive wheels by reducing energy loss due to tire flex. The automotive wheel can provide a combined wheel, propulsion and suspension with high energy efficiency for electric and hybrid vehicles. The overall dimensions of the automotive wheel can be approximately the same as those of a conventional wheel.

In one particular embodiment (FIG. 2), the automotive wheel 10 can be designed as an interchangeable replacement for a conventional automotive wheel.

The wheel 10 performs with high energy efficiency like a high pressure bicycle wheel where the road is smooth. Where the road is rough, it acts like a low pressure conventional cushioning wheel. To accomplish this goal, an embodiment of the wheel 10 (FIG. 2) incorporates a wheel hub 60 rotating about a wheel axle 21, and a multi-chambered tire 15. The multi-chambered tire includes a non-pneumatic outer tread ring 20 for simulating a high pressure tire, a nonporous first sidewall 40 and a nonporous second sidewall 41. The outer tread ring 20 encircles the wheel hub and is radially spaced apart from the hub.

Figure 1:
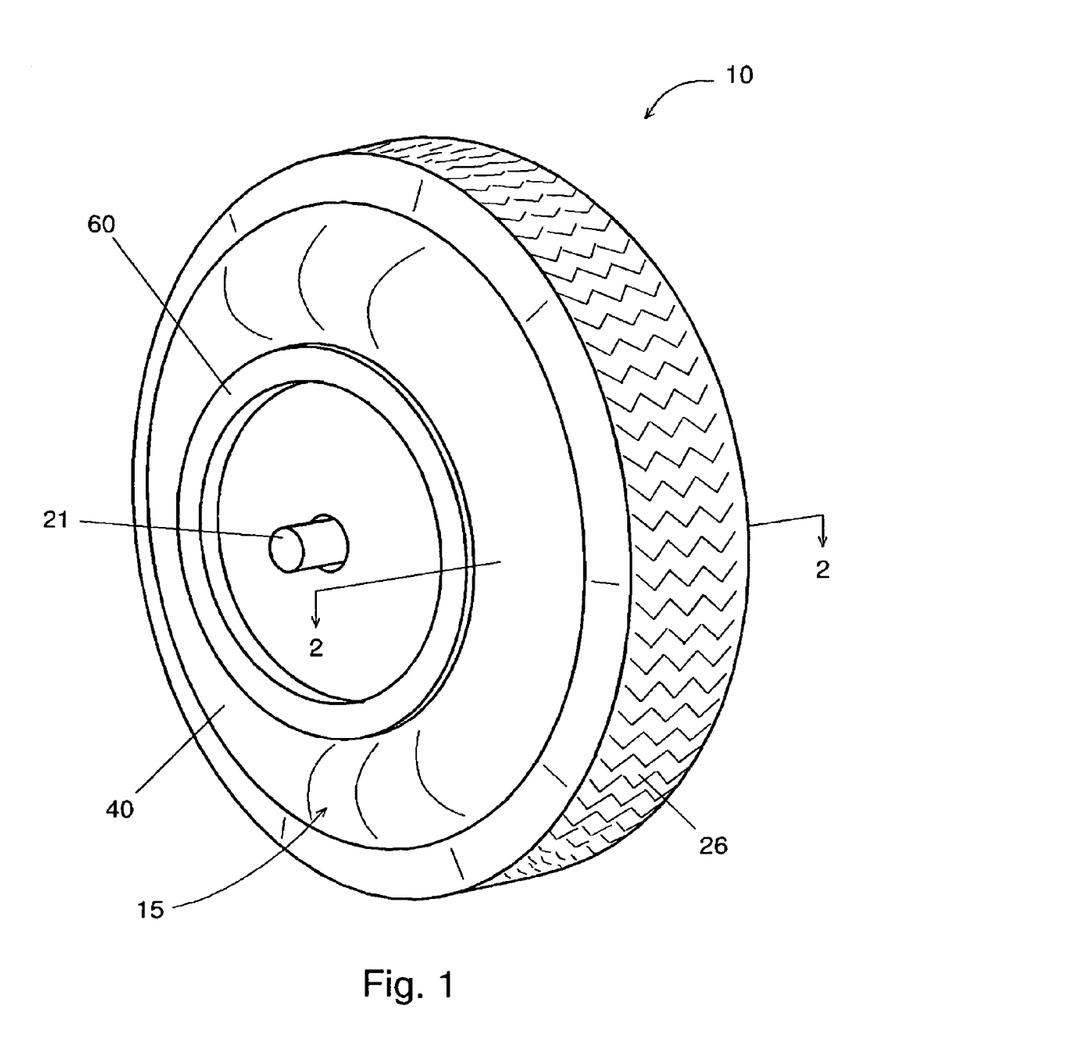
FIG. 1 is a perspective view of an embodiment of the present device.
Figure 2:
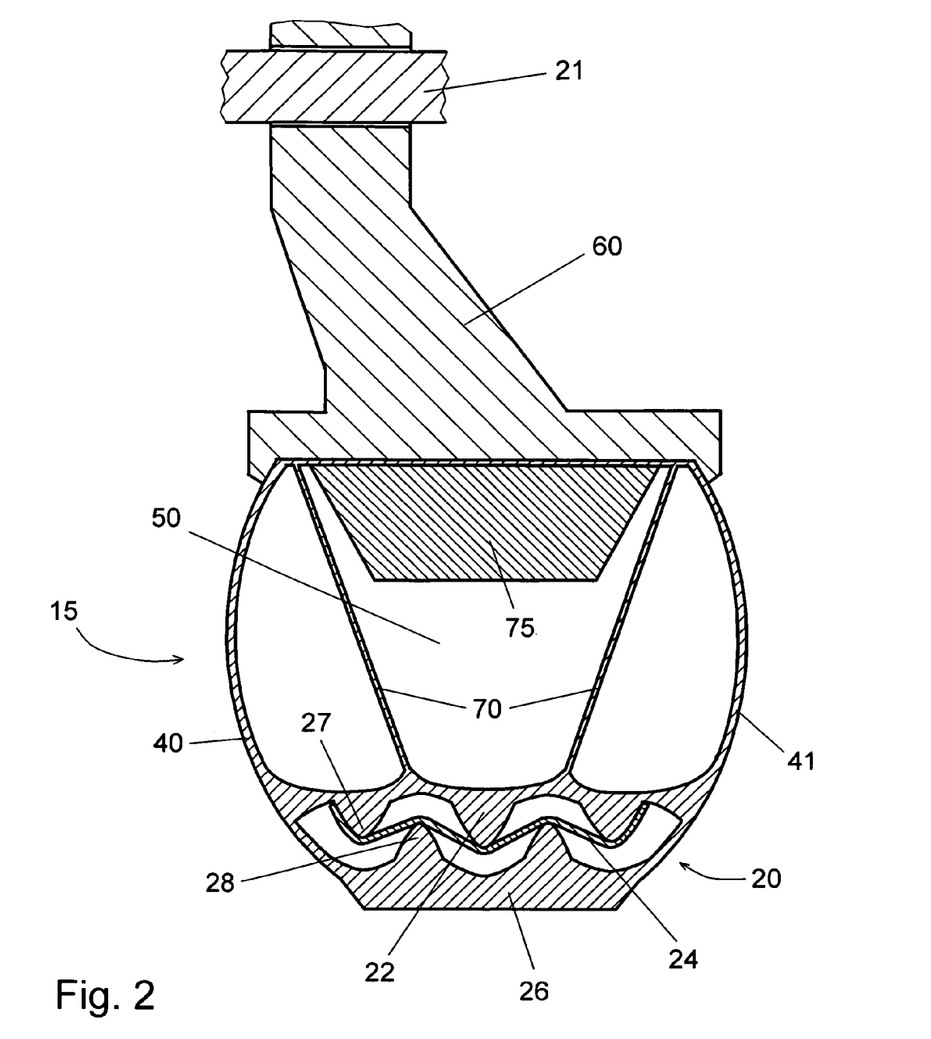
FIG. 2 is a section view along line 2-2 of the embodiment.

The tread ring 20 can be substantially toroidally shaped, for example with elliptical cross section, rectangular cross section, etc. Optionally, the outer tread ring can be pressurized with air or other gas.

The tread ring 20 includes an inner tread wall 22, a semi-rigid outer tread 26 which contacts the road, and an elastic band 24 which separates the inner tread wall 22 and semi-rigid outer tread 26. The semi-rigid outer tread 26 has at least one outer raised region 28, protruding inward toward the hub. The inner tread wall 22 has at least one inner raised region 27, protruding away from the hub. The inner and outer raised regions provide support for the elastic band 24, keeping it in proper position relative to the inner tread wall and semi-rigid outer tread.

The outer tread ring 20 may be belted with poly-para-phenylene terephthalamide (Kevlar®) or similar high strength, low extensibility material. The semi-rigid outer tread 26 may have a textured pattern molded on its outer road-contacting surface.

The first sidewall 40 and second sidewall 41 are axially spaced apart and encircle the wheel hub 60. The two sidewalls connect the outer tread ring 20 to the wheel hub 60, positioning the outer tread ring 20 concentrically to the wheel hub when there are no external road forces exerted on the wheel.

The outer tread ring 20, sidewalls 40, 41, and hub 60 enclose a low pressure pneumatic chamber 50 adjacent to the hub. The pneumatic chamber 50 (FIG. 2, 7) enables simulation of a conventional cushioning tire. The pneumatic chamber 50 may be inflated to a pressure approximately in the 70 kPa to 210 kPa (10 to 30 psi) range although the pressure may be set outside this range for special applications. The inner tread wall 22 helps contain the pressure of the pneumatic chamber 50.

The first and second sidewalls 40, 41 and the low pressure pneumatic chamber 50 provide restoring force to the outer tread ring 20 when the tread ring is deformed or buckled by road obstructions.

The sidewalls also limit azimuthal motion of the outer tread ring 20 relative to the other parts of the wheel. The sidewalls can be made with casing of materials such as rubber or urethane, with high tensile strength inelastic belting, for example poly-para-phenylene terephthalamide (Kevlar®). Resistance to axial motion of the tread ring 20 is approximately proportional to the spacing of the two sidewalls at their hub attachment. To maximize this resistance it is desirable to maximize the spacing of the sidewalls where they are attached to the wheel hub 60.

The semi-rigid outer tread 26 has high resilience and a predetermined degree of stiffness. It can be made of materials with various properties such as rubber, steel, carbon fiber, fiberglass, poly-para-phenylene terephthalamide (Kevlar®), or a combination thereof. The semi-rigid outer tread 26 may be constructed of a lamination of several different materials to provide a desirable restoring force profile when deformed.

Figure 8:
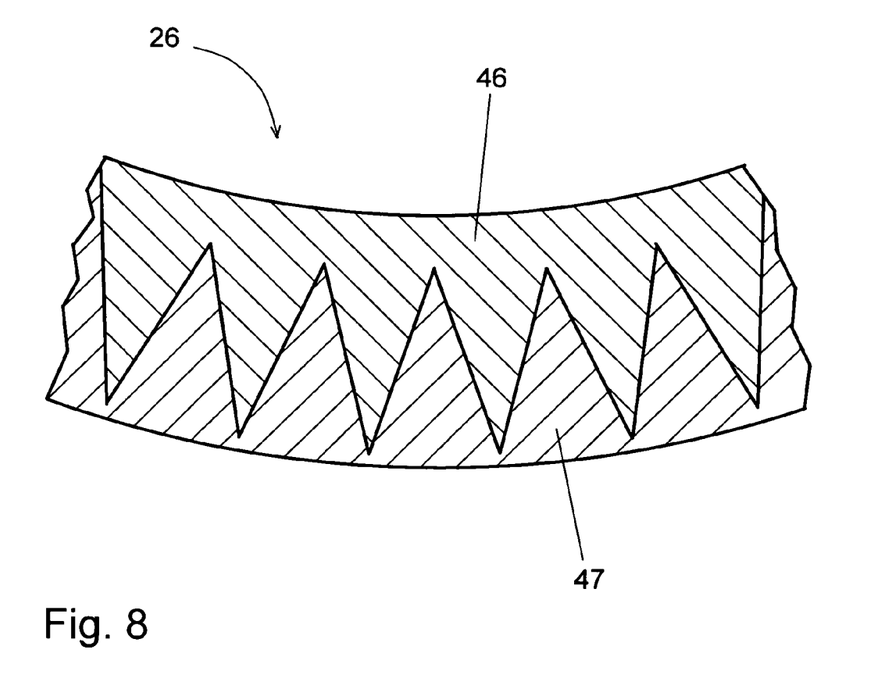
FIG. 8 is a section view of the semi-rigid outer tread along line 8-8 of the embodiment of FIG. 4.

FIG. 8 shows a section of a particular embodiment of the semi-rigid outer tread 26. The strong, inextensible belt 46 is laminated with an outer resilient layer 47 which provides resistance to kinking when the tread is deformed by road obstructions. The outer resilient layer 47 may be made of rubber or material of similar properties.

The semi-rigid outer tread 26 may be attached to the inner tread wall 22 near its junction with the sidewalls, to prevent debris from contacting the elastic band 24, and to reduce axial motion of the semi-rigid outer tread.

The inner raised regions 27 are positioned to cooperate with the outer raised regions 28 so that they do not oppose or obstruct each other. The elastic band 24, made of resilient or elastomeric materials such as rubber, is located between the inner tread wall 22 and semi-rigid outer tread 26. The elastic band 24 contacts, and may be attached to, those areas of the inner and outer raised regions which protrude to the greatest extent. The raised regions keep the elastic band 24 in a predetermined stretched condition and provide a restoring force which presses the semi-rigid outer tread 26 away from the inner tread wall 22.

Figure 3:
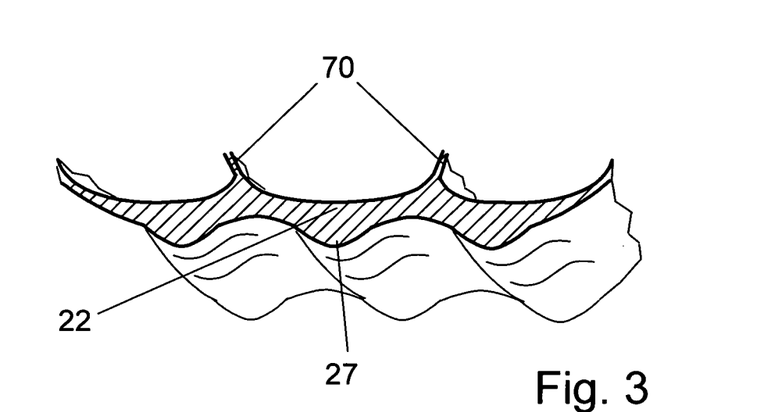
FIG. 3 is a perspective view of a portion of the embodiment.
Figure 4:
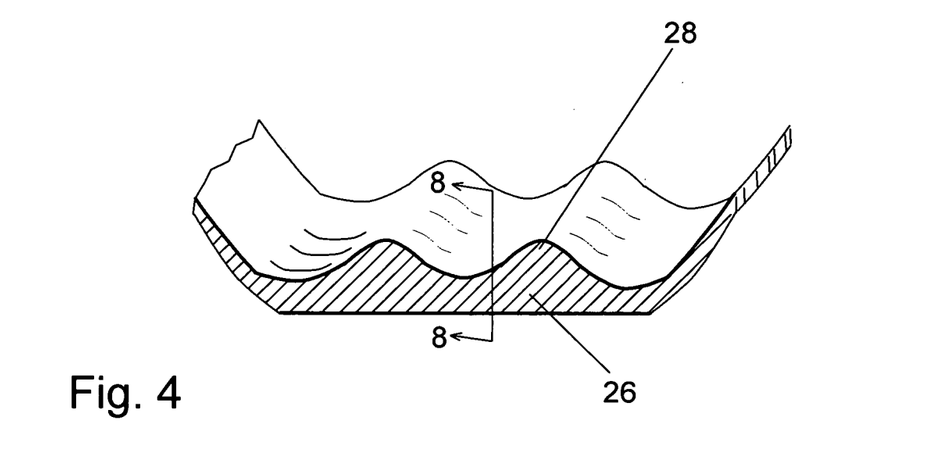
FIG. 4 is a perspective view of a portion of the embodiment.

In one embodiment (FIGS. 3 and 4), the inner raised regions 27 and outer raised regions 28 extend circumferentially all the way around the wheel.

In another embodiment (not shown), the inner raised regions and outer raised regions may extend axially instead of extending circumferentially around the wheel. The inner and outer raised regions cooperate so as not to cause mutual opposition or obstruction.

Figure 5:
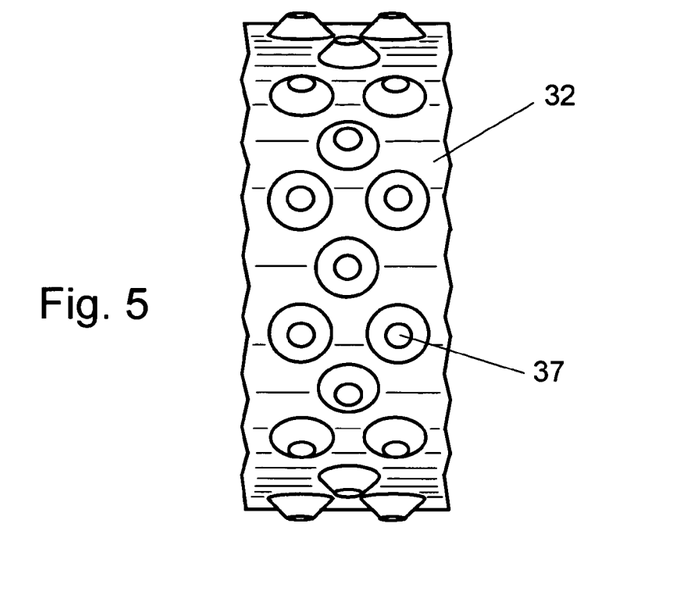
FIG. 5 is a side view of a cut portion of the inner tread wall of a second embodiment.
Figure 6:
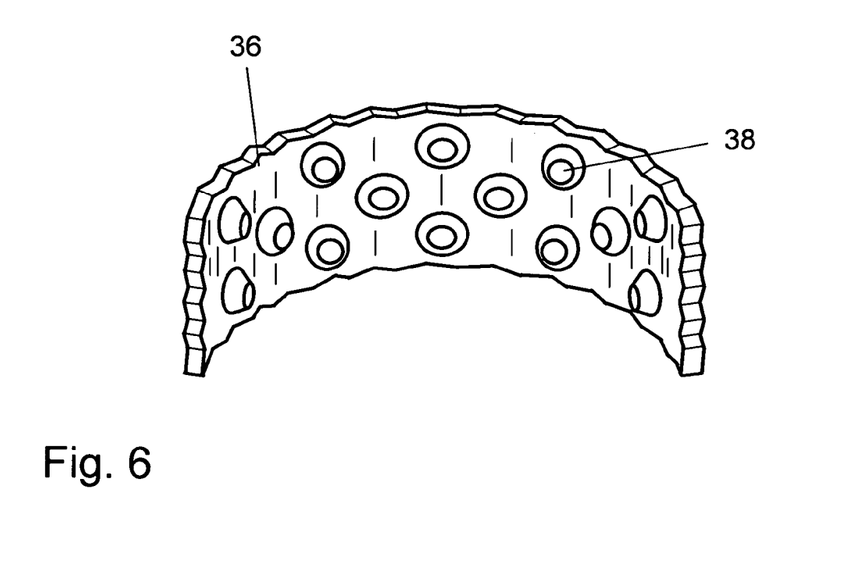
FIG. 6 is an oblique view of a cut portion of the semi-rigid outer tread of the second embodiment.

In yet another embodiment (FIGS. 5 and 6), the inner tread wall 32 and semi-rigid outer tread 36 have inner raised regions 37 and outer raised regions 38 that are localized and isolated. As in other embodiments, the inner and outer raised regions cooperate so as not to cause mutual opposition or obstruction.

Figure 7:
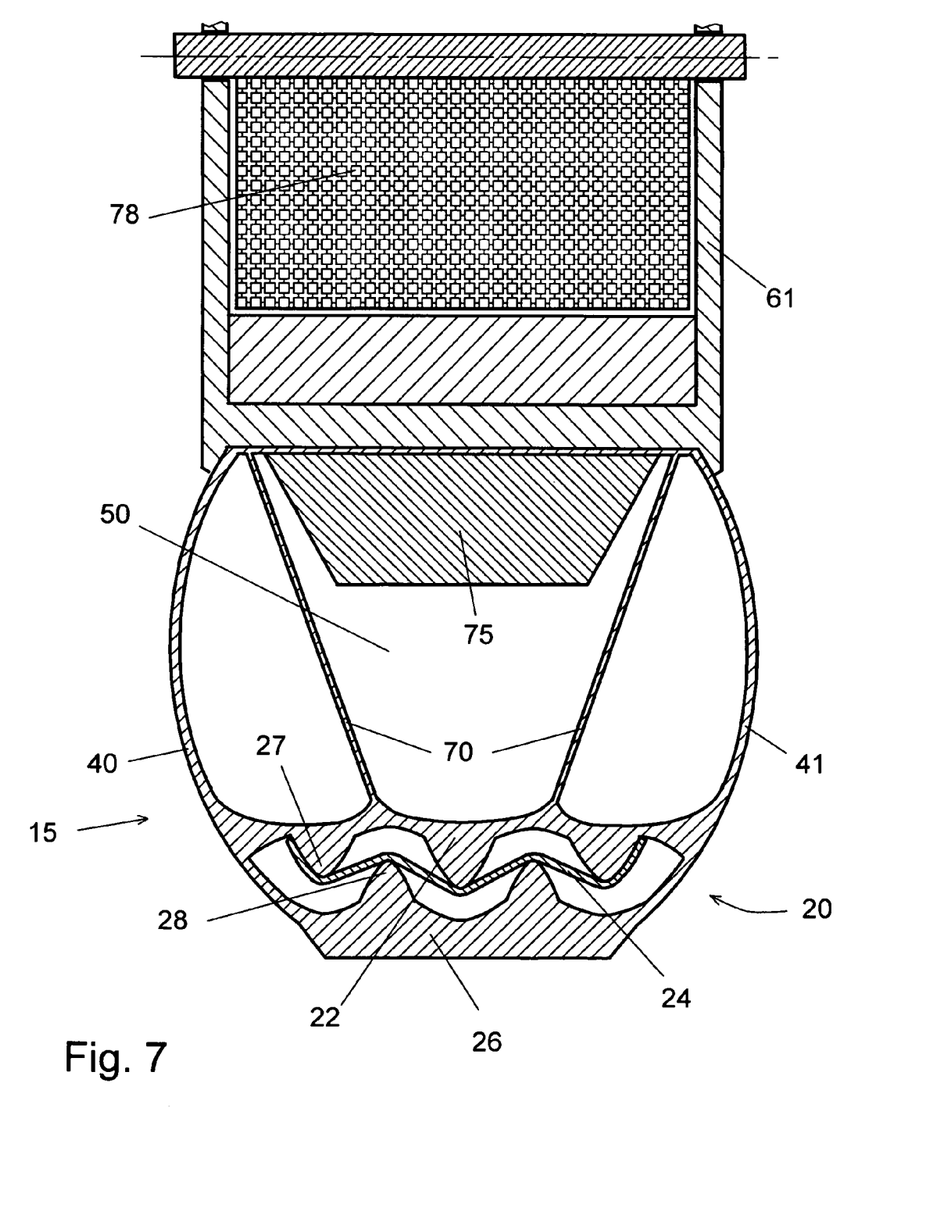
FIG. 7 is a section view of a third embodiment of the present device, along a plane parallel to and passing through the axle.

The outer tread ring 20 may be restrained radially and axially to the hub by one or more porous ring restraint bands 70 (FIG. 2, 7). The restraint bands encircle the hub and are located in the low pressure pneumatic chamber 50. The porous ring restraint bands 70 extend from at or near the wheel hub 60, to at or near the inner tread wall 22. The restraint bands can be made of nylon, or poly-para-phenylene terephthalamide (Kevlar®), or material with similar high strength properties. The restraint bands 70 have a porous or open meshed structure to reduce wear due to shearing forces, and to prevent pressure differences across the restraint bands. The restraint bands are flexible, strong and substantially inelastic. The restraint bands enable the low pressure pneumatic chamber 50 to resist deformation at road forces less than a predetermined threshold force. The restoring force on the outer tread ring 20 increases gradually as the buckling deformation increases. This allows a relatively large deformation of the outer tread ring towards the hub for a deforming force only moderately greater than the threshold force, enhancing the suspension and cushioning function of the wheel.

The ring restraint bands 70 and elastic band 24 can be connected to other parts of the wheel by methods including but not limited to, sewing, adhesive bonding, and thermal welding.

The wheel may have a hub protector 75 installed. The hub protector 75 is a ring encircling the hub, and located within the low pressure pneumatic chamber 50, between the two sidewalls and between the hub and outer tread ring 20. It may be made wholly or partially, of open cell, low-resilience foam. It may be made of polymer or similar material and can have various cross-sectional shapes. The hub protector 75 may have high mechanical hysteresis, meaning that the restoring force during the outer ring's return to circular shape is less than the force during the deformation, the energy difference being converted to heat. In this way the hub protector may serve as a shock absorber, cushioning impacts delivered to the wheel from road obstructions. Only large road obstructions activate it. As an additional benefit, if the pneumatic chamber 50 is punctured, the hub protector 75 enables driving the vehicle a short distance without damaging the hub.

Embodiment with Electric Hub Motor

The automotive wheel 10 may include an electric hub motor 78 (FIG. 7) integrated into a wheel hub 61. For extended life, the hub motor 78 may be of a DC brushless type designed for operation with a voltage controller. When a hub motor 78 is included in the wheel, the weight of external wheel bearings and suspensions is reduced, and the conventional drive train and transmission are eliminated for higher energy efficiency. In this way space is saved in the vehicle body which can be devoted to passengers and cargo.

At low speeds, ohm losses in the windings of a hub motor without gear reduction become larger compared to the mechanical output power, causing loss of efficiency. For this reason the hub motor 78 may be provided with a planetary gear reduction system (not shown) allowing the electric motor to run at a higher, more efficient speed, while providing a lower mechanical output rotation speed to the hub and tire.

The advantages of the planetary gear system are higher torque at all speeds, moderate to good efficiency at low speeds, and the possibility of shifting between different gear ratios. In conventional planetary gear systems, when gear teeth and rollers mesh, their surfaces are in relative motion, thus creating friction and energy loss. Bicycle chains reduce this problem by using rollers whose surfaces contact the sprocket teeth while rotating on their lubricated cores to reduce relative surface motion of roller and tooth. The relative motion takes place between the roller and its core, separated by a layer of lubrication which prevents actual contact, greatly reducing friction. The teeth of the hub motor's planetary gears are replaced with roller bearings of the type used in bicycle chains, and the teeth of the inner and outer gears are replaced with teeth of the type used in bicycle sprockets, that will properly mesh with the rollers. Energy loss due to gear tooth friction should be substantially reduced and service life should be correspondingly increased. An example of this type of gear arrangement is found in LeBus (U.S. Pat. No. 2,293,907). To reduce friction even further, the gear rollers themselves may have ball bearings.

Operation

The automotive wheel 10 is designed to accommodate various road conditions, including smooth and rough pavement, potholes, and gravel. On a smooth road, or a road with small irregularities, the semi-rigid outer tread 26 remains in substantially unflexed (rigid) mode. In this mode the road force displaces the semi-rigid outer tread 26 slightly from its position concentric with respect to the hub. This displacement causes the elastic band 24 to stretch, storing the energy of displacement, providing a restoring force on the semi-rigid outer tread 26 over its entire perimeter. As the wheel rotates, the elastic band 24 continually releases the stored energy to the semi-rigid outer tread 26. In this mode the wheel has rolling resistance approaching that of a high pressure pneumatic bicycle tire. The stiffness of the semi-rigid outer tread 26 is set to a high enough value so that it will flex substantially less in response to road forces than a conventional tire's tread section. The ring restraint bands 70 help center the outer tread ring to simulate the rigid support provided to a narrow high pressure tire by its rim.

Larger road obstructions cause the sidewalls to flex and buckle. The semi-rigid outer tread 26 departs from a circular shape to a greater degree. Near the road contact the outer tread 26 may maximally compress the elastic band 24, contacting the inner tread wall 22 and pressing it radially inward toward the hub 60, deforming the low pressure pneumatic chamber 50 and sidewalls. The restoring force provided by the pneumatic chamber 50 is activated by maximal compression of the outer tread ring 20. This maximal compression is predetermined to occur at a road force substantially greater than the vehicle weight on that wheel. At forces greater than this, the pneumatic chamber 50 takes on the function of cushioning the vehicle.

When encountering even larger road obstructions, the inner tread wall 22 may be deformed to the extent that it contacts the hub protector 75. The hub protector, which encircles the hub and is located in the low pressure pneumatic chamber 50, acts as a cushion and a shock absorber. When the outer tread ring 20 buckles toward the hub, the pneumatic chamber 50 and hub protector 75 act as a shock absorber and a cushioning support for the vehicle. It may absorb part of the resulting kinetic energy and convert it to heat.

Overall energy efficiency is not significantly reduced by the action of the pneumatic chamber 50 and the hub protector 75, since large road obstructions are relatively infrequent.

RAMIFICATIONS AND CONCLUSION

The wheel hub 60 may incorporate an electronically controlled automatic air pressure regulator (not shown) to control gas pressure in the pneumatic chamber 50.

The wheel may have disc brakes (not shown). The discs may be attached to the rotating outer hub and the shoes may be attached to the wheel axle 21 in the embodiment with hub motor 78. The disc brakes may serve as a backup for regenerative braking when the wheel is used in an electric or hybrid vehicle.

A replaceable tread (not shown) may be attached to the external surface of the semi-rigid outer tread 26. It may be made with belting of poly-para-phenylene terephthalamide (Kevlar®) or similar material. The replaceable tread protects the outer tread from wear and prolongs its life. Attachment methods such as beads, adhesive cement or vulcanization may secure the replaceable tread to the outer tread 26.

The present device overcomes the three shortcomings of the Russell wheel noted above. First, the hub is recessed towards the axle to a much greater extent than in the Russell wheel, preventing rim damage in the manner of a conventional wheel. Second, almost the entire elastic band is actively involved in stretching in response to the road forces, leading to greater efficiency in use of material. Third, in the present device there is no sliding contact between the elastic band and other surfaces, preventing wear of the band that may lead to its catastrophic failure.

The present device also overcomes the shortcomings of the Lambe wheel noted above. The internal restraint bands in the low pressure chamber help position the outer tread ring relative to the hub. This enables better simulation of the rigid support provided to a narrow high pressure tire by its rim. As a side benefit, the bands also reduce flexing of the sidewalls, reducing energy loss.

The widespread use of electric vehicles has been impractical in the past for two main reasons. The primary obstacle is lack of range due to inadequate battery capacity. However, even if battery capacity were adequate, the charging of these vehicles would severely tax household power circuits and in turn the entire electrical grid if implemented on a mass scale. The aging US power grid has difficulty satisfying increasing demand as it is. If electric vehicles are to serve as a serious alternative to fossil fueled cars then a large increase in electric vehicle efficiency and range is clearly necessary. An automobile that not only has zero carbon emission as in electric vehicles, but is highly energy efficient, would be desirable. Combining the present device with existing automotive technologies should bring this goal within reach in the near future.

Although the above description contains many details, these should not be construed as limiting the scope of the embodiments but as describing only several of many possible embodiments.

The invention claimed is:

1. An automotive wheel comprising:
   a wheel hub rotating about a wheel axle;
   a multi-chambered tire encircling and attached to said wheel hub, the tire comprising:
      (i) first and second sidewalls spaced axially apart;
      (ii) an outer tread ring, encircling the hub and spaced radially apart from the wheel hub, said outer tread ring being attached to the first and second sidewalls, said outer tread ring comprising:
         (a) an inner tread wall encircling the hub, said inner tread wall having at least one inner raised region protruding away from the wheel hub;
         (b) a semi-rigid outer tread encircling the hub and disposed over the inner tread wall, said semi-rigid outer tread having at least one outer raised region protruding toward the wheel hub, the at least one inner raised region cooperating with the at least one outer raised region to prevent mutual obstruction;
         (c) an elastic band encircling the hub, medial the inner tread wall and the semi-rigid outer tread, said elastic band contacting the at least one inner raised region and the at least one outer raised region, said elastic band being in a predetermined stretched condition;
   the wheel hub, the first and second sidewalls, and the inner tread wall enclosing a low pressure pneumatic chamber, whereby said multi-chambered tire is made to simulate a conventional cushioning pneumatic tire under rough road conditions.

2. The automotive wheel recited in claim 1, wherein the inner tread wall is restrained radially and axially to the wheel hub by at least one porous ring restraint band, the at least one porous ring restraint band encircling the wheel hub within said low pressure pneumatic chamber, whereby radial and axial alignment of said inner tread wall is provided for improved simulation of a high pressure pneumatic tire under smooth road conditions.

3. The automotive wheel recited in claim 1, further comprising a hub protector encircling said wheel hub within said low pressure pneumatic chamber, whereby shock absorption and safe operation in the event of punctures is provided.

4. The automotive wheel recited in claim 1, wherein the wheel hub comprises an electric hub motor, whereby the wheel hub is driven in rotation about the wheel axle.

5. The automotive wheel recited in claim 2, further comprising a hub protector encircling said wheel hub within said low pressure pneumatic chamber, whereby shock absorption and safe operation in the event of punctures is provided.

6. The automotive wheel recited in claim 2, wherein the wheel hub comprises an electric hub motor, whereby said wheel hub is driven in rotation about said wheel axle.

7. The automotive wheel recited in claim 3, wherein the wheel hub comprises an electric hub motor, whereby said wheel hub is driven in rotation about said wheel axle.

8. The automotive wheel recited in claim 5, wherein the wheel hub comprises an electric hub motor, whereby said wheel hub is driven in rotation about said wheel axle.

9. An automotive wheel comprising:
a wheel hub rotating about a wheel axle;
a multi-chambered tire encircling and attached to said wheel hub, the tire comprising:
  (i) first and second sidewalls spaced axially apart;
  (ii) an outer tread ring, encircling the hub and spaced radially apart from the wheel hub and attached to the first and second sidewalls, said outer tread ring comprising:
    (a) an inner tread wall encircling the hub, said inner tread wall having at least one inner raised region protruding away from the wheel hub;
    (b) an elastic band encircling the hub, disposed over said inner tread wall, said elastic band being in a predetermined stretched condition;
    (c) a semi-rigid outer tread encircling the hub and disposed over said elastic band, said semi-rigid outer tread having at least one outer raised region protruding toward the wheel hub, the at least one outer raised region cooperating with the at least one inner raised region to prevent mutual obstruction;
said elastic band contacting the at least one inner raised region and the at least one outer raised region;
said wheel hub, the first and second sidewalls, and the inner tread wall enclosing a low pressure pneumatic chamber, whereby said multi-chambered tire is made to simulate a conventional cushioning pneumatic tire under rough road conditions.

10. The automotive wheel recited in claim 9, wherein the inner tread wall is restrained radially and axially to the wheel hub by at least one porous ring restraint band, the at least one porous ring restraint band encircling the wheel hub within said low pressure pneumatic chamber, whereby radial and axial alignment of said inner tread wall is provided for improved simulation of a high pressure pneumatic tire under smooth road conditions.

11. The automotive wheel recited in claim 9, further comprising a hub protector encircling said wheel hub within said low pressure pneumatic chamber, whereby shock absorption and safe operation in the event of punctures is provided.

12. The automotive wheel recited in claim 9, wherein the wheel hub comprises an electric hub motor, whereby the wheel hub is driven in rotation about the wheel axle.

13. The automotive wheel recited in claim 10, further comprising a hub protector encircling said wheel hub within said low pressure pneumatic chamber, whereby shock absorption and safe operation in the event of punctures is provided.

14. The automotive wheel recited in claim 10, wherein the wheel hub comprises an electric hub motor, whereby said wheel hub is driven in rotation about said wheel axle.

15. The automotive wheel recited in claim 11, wherein the wheel hub comprises an electric hub motor, whereby said wheel hub is driven in rotation about said wheel axle.

16. The automotive wheel recited in claim 13, wherein the wheel hub comprises an electric hub motor, whereby said wheel hub is driven in rotation about said wheel axle.

* * * * *